(12) United States Patent
Chou

(10) Patent No.: US 7,146,161 B2
(45) Date of Patent: Dec. 5, 2006

(54) SUBSCRIBER IDENTITY MODULE CARD BACKUP SYSTEM

(76) Inventor: Cheng-Hao Chou, 15F-1, No. 8, Sec. 1, Kee Lung Rd., Taipei (TW)

( * ) Notice: Subject to any disclaimer, the term of this patent is extended or adjusted under 35 U.S.C. 154(b) by 449 days.

(21) Appl. No.: 09/940,737

(22) Filed: Aug. 27, 2001

(65) Prior Publication Data

US 2003/0038791 A1    Feb. 27, 2003

(51) Int. Cl.
*H04M 3/00* (2006.01)
*H04B 1/38* (2006.01)

(52) U.S. Cl. .................................. 455/418; 455/558

(58) Field of Classification Search ................ 455/418, 455/419, 420, 550.1, 558, 88, 557, 556.2; 235/380, 133 R; 711/162
See application file for complete search history.

(56) References Cited

U.S. PATENT DOCUMENTS

| | | | | |
|---|---|---|---|---|
| 5,733,147 | A * | 3/1998 | Verstijnen | 439/630 |
| 6,092,133 | A * | 7/2000 | Erola et al. | 710/301 |
| 6,353,737 | B1 * | 3/2002 | Herzog | 455/418 |
| 6,456,859 | B1 * | 9/2002 | Desblancs et al. | 455/558 |
| 6,504,932 | B1 * | 1/2003 | Vasnier et al. | 380/273 |
| 2002/0160808 | A1 * | 10/2002 | Uehara et al. | 455/558 |
| 2004/0124238 | A1 * | 7/2004 | Shimada et al. | 235/375 |
| 2005/0096087 | A1 * | 5/2005 | Kim | 455/558 |

FOREIGN PATENT DOCUMENTS

| | | | |
|---|---|---|---|
| DE | 10146664 A1 | * | 2/2003 |
| EP | 1 134 956 A1 | * | 9/2001 |
| JP | 63168755 A | * | 7/1988 |
| JP | 2001-186556 | * | 7/2001 |
| WO | WO 01/62029 A1 | * | 8/2001 |

* cited by examiner

*Primary Examiner*—Nguyen T. Vo
(74) *Attorney, Agent, or Firm*—The Maxham Firm

(57) ABSTRACT

An apparatus for backing up the storage data from a subscriber identity module card will comprise said followings: the subscriber identity module card connector, a central processing unit, a serial electrically erasable programmable read only memory, the displays, the power supply and the inputting device. Firstly, inserting a first subscriber identity module card into a subscriber identity module card connector of the subscriber identity module card backup system is carried out. Then, a first storage data from the subscriber identity module card is extracted and treated to a memory whereby a central processing unit. Next, backing up the first storage data into the memory whereby said central processing unit is achieved. Sequentially, the first subscriber identity module card can be removed from the subscriber identity module card connector. Next, a second subscriber identity module card is inserted into the subscriber identity module card connector. Finally, the first storage data is duplicated from the serial electrically erasable programmable read only memory into the second subscriber identity module card in order to back up the first storage data from the first subscriber identity module card to the second subscriber identity module card.

16 Claims, 3 Drawing Sheets

SUBSCRIBER IDENTITY MODULE CARD BACKUP SYSTEM

FIELD OF THE INVENTION

The present invention relates to an electrical card and, particularly a subscriber identity module card backup system.

BACKGROUND OF THE INVENTION

Along with the rapid development of wireless communication, mobile communication devices have become an indispensable part of modern life. With the introduction of the Global System for Mobile (GSM) communication and the Personal Communications System (PCS), mobile subscribers are provided with a number of advanced subscriber features and applications. Using a Subscriber Identity Module (SIM) card attached to a mobile communication device, the GSM system directs a user's incoming calls to the mobile communication device. The SIM card is a user replacement module for used by a commercial entity providing a network to ensure that the mobile communication device is connected to the commercial entity's network. The user can change mobile apparatuses simply by moving the SIM card from a mobile apparatus to another.

The most important information stored in a SIM card comprising the subscriber's identification information, such as the subscriber's phone number, user code, personal identity code (PIC), security code, etc., needed by the mobile system to identify, authenticate and locate a mobile subscriber will be contained into a dedicated module. A mobile subscriber is also able to store necessary personal information, for example short messages, subscriber's private phone book, schedules, and other user-selectable information, in the memory unit of a detachable SIM card and freely associates it with any available mobile apparatus.

With the increasing demand for wireless communication services and the decreasing of mobile apparatus price, users prone to upgrade their mobile apparatuses more and more frequently and owning several mobile apparatuses at the same time is not uncommon anymore. Therefore, by inserting the original SIM card of a replaced apparatus into another mobile apparatus, the stored subscriber information in the inserted SIM card is available to the newly utilized mobile terminal. As a result, the mobile subscriber is able to freely utilize any available mobile apparatus while maintaining the same subscriber feature data.

However, mobile subscribers may want to replace the original SIM card yet preserve and transfer the stored data into a new SIM card or to share stored data among all possessed mobile apparatuses. Therefore, how to easily duplicate data from the replaced SIM card into the new one, or to share information among various mobile apparatuses has becoming an increasing need of mobile communication users.

On the other hand, it is not an uncommon situation for a subscriber to accidentally lose a mobile apparatus. The information stored in the SIM card, which may contain important business or personal information, is also lost along with the lost mobile apparatus. One effective solution is to update and backup the data stored in the SIM card regularly, a function unfulfilled by any current mobile apparatus or related device.

SUMMARY OF THE INVENTION

In accordance with the present invention, a method is provided the reader system for the subscriber identity module (SIM) card treating that substantially securing the data from the SIM card.

It is object that the present invention provides excellent SIM security effect.

It is another object that the present invention can be used and is easy for renewing the storage data.

It is the other object that the present invention can avoid the storage data lost from the SIM card.

An apparatus for backing up the storage data from a subscriber identity module card will comprise the following components:

A subscriber identity module card connector is mounted on a printed circuit board, which accommodates the subscriber identity module card and transfers a first storage data of the subscriber identity module card to a central processing unit. The central processing unit controls a flow of programs and treats the first storage data in and out of a memory. The memory is that the serial data for reading, writing and storing results in relatively long access times. The displays can be illustrated for showing the first storage data after the treatment from the central processing unit. The power supply supports a driving force for the memory, the central processing unit and the liquid crystal display. The inputting device is for inputting or changing a second storage data to the subscriber identity module card backup system.

Therefore, according to the above description, the present method for backing up the storage data from a subscriber identity module card will comprise the following steps:

Firstly, inserting a first subscriber identity module card into a subscriber identity module card connector of the subscriber identity module card backup system is carried out. Then, a first storage data from the subscriber identity module card is extracted and treated to a memory whereby a central processing unit. Next, backing up the first storage data into the memory whereby said central processing unit is achieved. Sequentially, the first subscriber identity module card can be removed from the subscriber identity module card connector. Next, a second subscriber identity module card is inserted into the subscriber identity module card connector. Finally, the first storage data is duplicated from the serial electrically erasable programmable read only memory into the second subscriber identity module card in order to back up the first storage data from the first subscriber identity module card to the second subscriber identity module card. Certainly, the previous subscriber identity module card can comprise a plurality of subscriber identity module cards.

The foregoing, as well as additional objects, features and advantages of the invention will be more readily apparent from the following description, which proceeds with reference to the accompanying drawings.

BRIEF DESCRIPTION OF THE DRAWINGS

The foregoing aspects and many of the attendant advantages of this invention will become more readily appreciated as the same becomes better understood by reference to the following description, when taken in conjunction with the accompanying drawings, wherein.

DESCRIPTION OF THE PREFERRED EMBODIMENT

The following is a description of the present invention. The invention will firstly be described with reference to one exemplary structure. Some variations will then be described as well as advantages of the present invention. A preferred method of fabrication will then be discussed.

Moreover, while the present invention is illustrated by a number of preferred embodiments directed to SIM card, it is not intended that these illustrations be a limitation on the scope or applicability of the present invention. Further, while the illustrative examples use SIM card reader, it should be recognized that the electrical portions might be replaced with other electrical related portions. Thus, it is not intended that the SIM card of the present invention be limited to the structures illustrated. This card is included to demonstrate the utility and application of the present invention to presently preferred embodiments.

Figure 1:
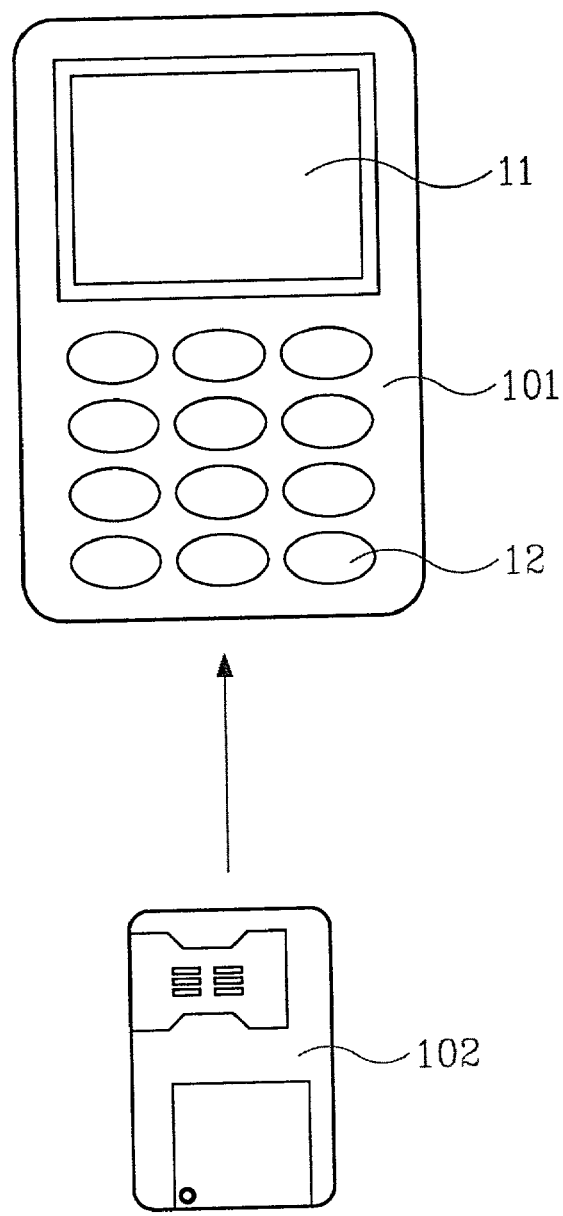
FIGS. 1A and 1B are schematic diagrams showing the SIM card with the SIM card reader of present invention.

The spirit of the proposed invention can be explained and understood by the following embodiments with corresponding figures. Therefore, with reference to FIG. 1, the subscriber identity module (SIM) card backup system 101 according to the present invention is schematically shown to include a liquid crystal display (LCD) screen 11 (or instead of the light emitting diode), a keypad 12. The SIM card 102 is prepared for inserting into the SIM card backup system.

Figure 2:
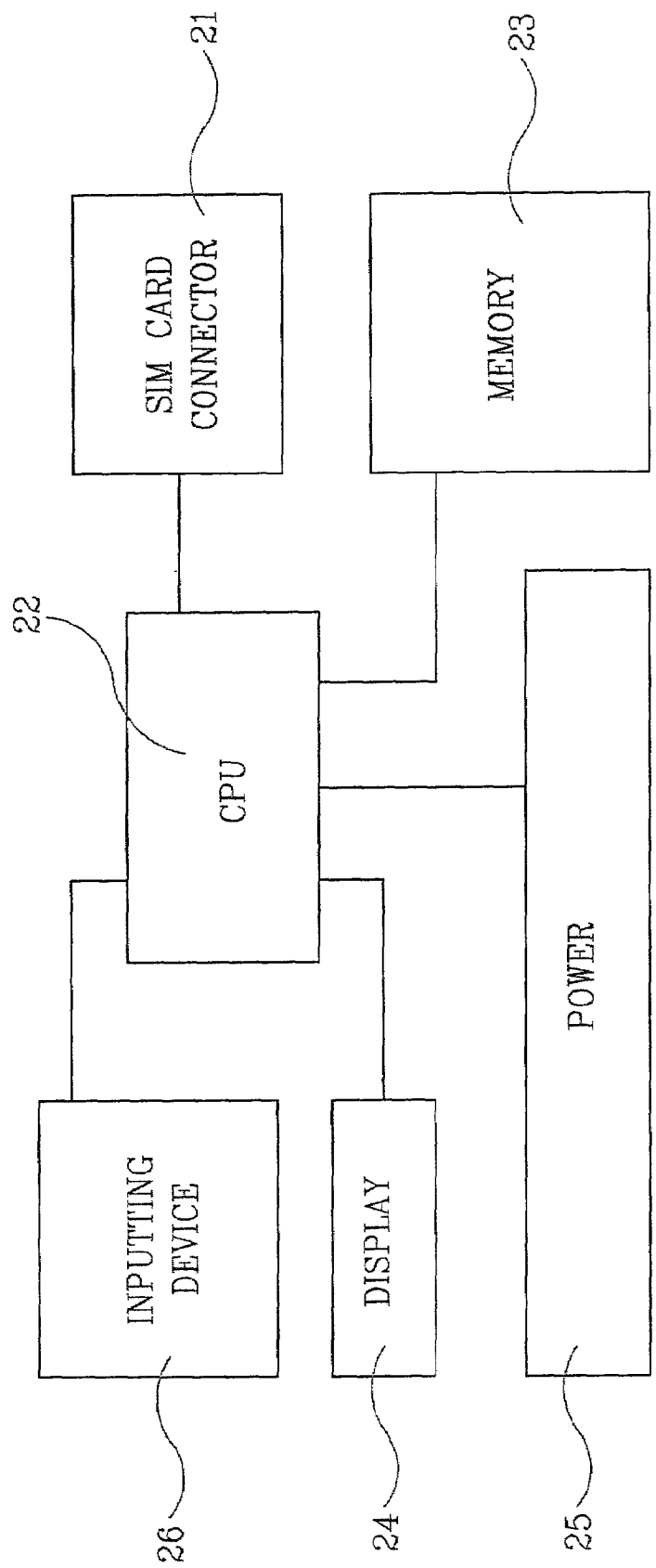
FIG. 2 is illustrative of various components in the structure with the embodiment of present invention.

It will briefly be noted here that structure in FIG. 2. In the FIG. 2, SIM card connector 21 is mounted on a printed circuit board, which accommodates SIM card and transfers the data of SIM to the central processing unit (CPU) 22. Normally, the card connector is for connecting electrical cards and it mainly boards in computers to meet different requirements.

Of course, the present structure such as the previous module system can also apply to the requirement for the telecommunication device (including the telephone and the mobile phone) and the personal digital assistant (PDA). Normally, the telecommunication device (including telephone and mobile phone) can comprise the communication apparatus for communicating and the above SIM backup system module inside. The personal digital assistant (PDA) comprises not only the processing personal data part for processing the personal data, but also the previous SIM backup system module inside.

Referring with the FIG. 2, the present embodiment for illustrating the central unit system (CPU) 22 of the SIM card backup system is provided for controlling a flow of programs and treats the first storage data in and out. The central processing unit 22 is a brain of computer system, which will conclude the main primary functions: Firstly, reading and interpreting program instructions is necessary. Then, the need is to direct the operation of the internal processor components. The last is that to control the flow of programs and data in and out of memory.

The legend 23 of FIG. 2 is the electrically erasable programmable read only memory (EEPROM) or the flash memory offers a low cost and small foot print memory for critical and non-critical information. The EEPROM is that the serial data for reading, writing and storing results in relatively long access times. Another point is the need to monitor or control each separate bit during an access of a serial memory.

The legend 24 of FIG. 2 is shown as the liquid crystal displays (LCD) 24, which are illustrated for showing the any possible result after the treatment from the central processing unit 22. Normally, the LCD screen is used in watches, clocks, pocket calculators, portable personal computers, chemical instruments and the like, are electronically switched displays that make use of changes in the reflective properties of liquid crystals present in an electric field. A typical liquid crystal display owns a liquid crystal display panel, normally there is a thin film of liquid crystals sandwiched between a pair of transparent electrodes in the panel. Another, the light emitting diode (LED) display can be provided for the present invention as well.

Power supply 25 such as battery is illustrated as the legend 25 of FIG. 2. Typically, electrical power is generated by the power supply 25, which supports the work-piece and mechanical parts including SIM card connector, EEPROM or flash memory, CPU and liquid crystal display (LCD) or light emitting diode (LED).

Inputting device 26, such as keypad in the FIG. 2 is for inputting or changing any kind of information to the SIM card backup system, especially by the user's decision. Commonly, the conventional keypad, vocal and touch-screen also can support the embodiment of the present invention.

Figure 3:
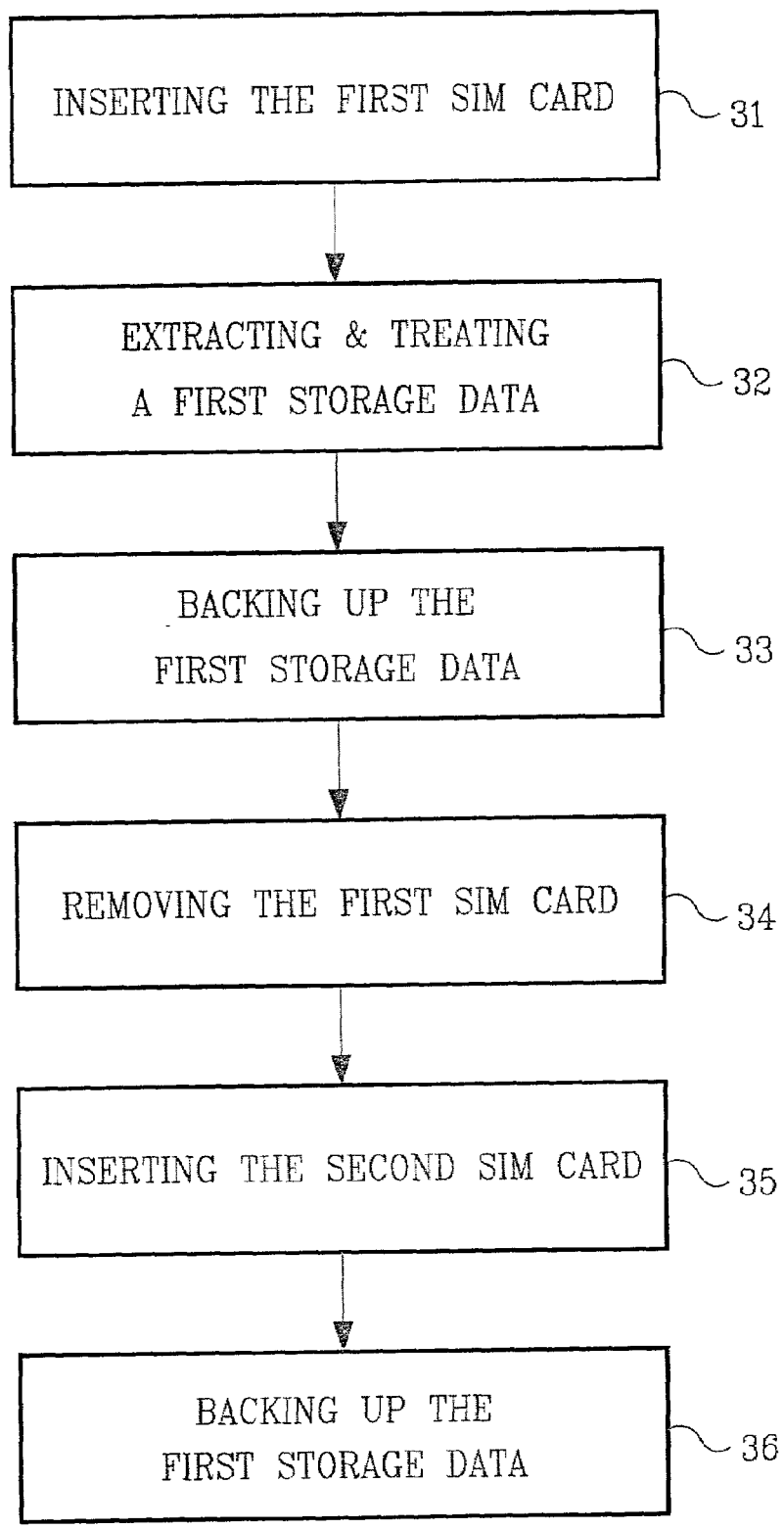
FIG. 3 is a flow chart schematically illustrating the embodiment of the present invention.

Therefore, according to the above description, the present method for backing up the storage data from a subscriber identity module card will comprise the following steps with drawings as FIG. 3:

Firstly, as the legend 31 of FIG. 3, inserting a first subscriber identity module card into a subscriber identity module card connector of the subscriber identity module card system is carried out.

Then, as legend 32 of FIG. 3, a first storage data from the subscriber identity module card is extracted and treated to a serial electrically erasable programmable read only memory or flash memory whereby a central processing unit.

Referring with legend 33 of FIG. 3, backing up the first storage data into the serial electrically erasable programmable read only memory or flash memory whereby said central processing unit is achieved.

Sequentially, as legend 34 of FIG. 3, the first subscriber identity module card can be removed from the subscriber identity module card connector.

Next, as legend 35 of FIG. 3, a second subscriber identity module card is inserted into the subscriber identity module card connector.

Finally, as legend 36 of FIG. 3, the first storage data is duplicated from the serial electrically erasable programmable read only memory or flash memory into the second subscriber identity module card in order to back up the first storage data from the first subscriber identity module card to the second subscriber identity module card. Certainly, the previous subscriber identity module card can comprise a plurality of subscriber identity module cards.

In summary, the present invention has the following advantages:

1. The preferred embodiment of the invention can provide excellent SIM security effect.
2. The preferred embodiment of the invention can be easy for renewing the storage data.
3. The preferred embodiment of the invention can avoid the lost of the data from the SIM card.

While the preferred embodiment of the invention has been set forth for purpose of disclosure, modifications of the disclosed embodiment of the invention as well as other embodiments thereof may occur to those skill in the art.

Accordingly, the appended claims are intended to cover all embodiments that do not depart from the spirit and scope of the invention.

What is claimed is:

1. A communication device without RF (radio frequency) transceiver, the device comprising:
a backup memory for storing digital data for backup;
a processor coupled to said backup memory for controlling the operation of said communication device;
a backup connector coupled to said processor for holding and connecting a plurality of first SIM cards (subscriber identity module card) with backup data and transferring said backup data from said plurality of first SIM cards to said backup memory, and for holding a plurality of second SIM cards thereby transferring said backup data transferred from said plurality of first SIM cards into said plurality of second SIM cards;
an information changing input for inputting instructions to said processor, wherein said information changing input is used for changing said backup and extracted data;
an information extracting means for extracting said backup data;
a power supply coupled to said processor for providing power; and
a displayer coupled to said processor for displaying said extracted data transferred from said first SIM cards;
wherein said processor restores said extracted data transferred from said plurality of first SIM cards to said plurality of second SIM cards according to instructions of said information extracting means.

2. The communication device as set forth in claim 1, wherein said backup memory comprises flash memory.

3. The communication device as set forth in claim 1, wherein said memory comprises electrically erasable programmable read only memory (EEPROM).

4. The communication device as set forth in claim 1, wherein said displayer comprises a liquid crystal display.

5. The communication device as set forth in claim 1, wherein said information changing input comprises a keypad.

6. A personal digital assistant (PDA) without RE (radio frequency) transceiver, the PDA comprising:
a backup memory for storing digital data for backup;
a processor coupled to said backup memory for controlling the operation of said PDA;
a backup connector coupled to said processor for holding and connecting a plurality of first SIM cards (subscriber identity module card) with backup data and transferring said backup data from said plurality of first SIM cards to said backup memory, and for holding a plurality of second SIM cards thereby transferring said backup data transferred from said plurality of first SIM cards into corresponding said plurality of second SIM cards;
an information changing input for inputting instructions to said processor, wherein said information changing input is used for changing said backup and extracted data;
an information extracting means for extracting said backup data;
a power supply coupled to said processor for providing power;
a displayer coupled to said processor for displaying said extracted data transferred from said first SIM cards; and
wherein said processor restores said extracted data transferred from said plurality of first SIM cards to said plurality of second SIM cards according to instructions of said information extracting means.

7. The personal digital assistant as set forth in claim 6, wherein said backup memory comprises flash memory.

8. The personal digital assistant as set forth in claim 6, wherein said displayer comprises a liquid crystal display.

9. The personal digital assistant as set forth in claim 6, wherein said information changing input comprises a keypad.

10. The personal digital assistant as set forth in claim 6, wherein said information changing input comprises a touch screen panel.

11. A backup device comprising:
a backup memory for storing digital data for backup;
a processor coupled to said backup memory for controlling data exchange;
a backup connector coupled to said processor for holding and connecting a plurality of first SIM cards (subscriber identity module card) with backup data and transferring said backup data from said plurality of first SIM cards to said backup memory, and for holding a plurality of second SIM cards thereby transferring said backup data transferred from said plurality of first SIM cards into corresponding said plurality of second SIM cards;
an information changing input for inputting instructions to said processor, wherein said information changing input is used for changing said backup and extracted data;
an information extracting means for extracting said backup data;
a power supply coupled to said processor for providing power;
a displayer coupled to said processor for displaying said extracted data transferred from said first SIM cards; and
a backup program coupled to said processor provided for controlling a flow of data in said backup program and treating said backup data transferred from said first SIM cards in and out of said memory;
wherein said processor restores said extracted data transferred from said plurality of first SIM cards to said plurality of second SIM cards according to instructions of said information extracting means, and wherein said backup device is free of a RF transceiver.

12. The device set forth in claim 11, wherein said backup memory comprises flash memory.

13. The device as set forth in claim 11, wherein said backup memory comprises electrically erasable programmable read only memory (EEPROM).

14. The device as set forth in claim 11, wherein said displayer comprises a liquid crystal display.

15. The device as set forth in claim 11, wherein said displayer comprises a light emitting diode display.

16. The device as set forth in claim 11, wherein said information changing input comprises a keypad.

* * * * *